United States Patent [19]

Brooks et al.

[11] Patent Number: 5,504,788
[45] Date of Patent: Apr. 2, 1996

[54] SUPPORT PLATE INSPECTION DEVICE

[76] Inventors: Raymond J. Brooks, 7211 Furnace Rd., Ontario, N.Y. 14519; John M. Gay, 364 French Rd., Pittsford, N.Y. 14534; Bruce A. Weir, 420 Haley Rd., Ontario, N.Y. 14519; Paul E. McEntee, 61 Bellmawr Dr., Rochester, N.Y. 14624; Lauren Blood, 3832 Center St., Livonia Center, N.Y. 14488

[21] Appl. No.: 154,960

[22] Filed: Nov. 19, 1993

Related U.S. Application Data

[63] Continuation of Ser. No. 865,118, Apr. 8, 1992, Pat. No. 5,265,129.

[51] Int. Cl.⁶ .................................................. G21C 17/00
[52] U.S. Cl. .......................... 376/248; 376/245; 376/249
[58] Field of Search .................................... 376/245, 248, 376/249; 165/11.2

[56] References Cited

U.S. PATENT DOCUMENTS

| | | | |
|---|---|---|---|
| 4,222,540 | 9/1980 | King et al. | 248/205 R |
| 4,231,419 | 11/1980 | Gugel | 165/11 A |
| 4,438,805 | 3/1984 | Gugel | 165/76 |
| 4,474,439 | 10/1984 | Brown | 352/243 |
| 4,638,667 | 1/1987 | Zimmer et al. | 73/432.1 |
| 4,653,971 | 3/1987 | Bernardin | 414/8 |
| 4,661,309 | 4/1987 | Hayes | 376/248 |
| 5,065,703 | 11/1991 | Lee | 122/382 |
| 5,177,516 | 1/1993 | Fitz et al. | 354/81 |

Primary Examiner—Ngoclan Mai
Assistant Examiner—Meena Chelliah

[57] ABSTRACT

A device for inspecting the support plates and tube sheet of a nuclear steam generator. The device comprises a boom for extending into an access port of a steam generator and into a lane separating two rows of members, the boom being uprightable within the lane; and a video camera attached to the boom for inspecting the tube members and support plates within the lane when the boom is uprighted. In a preferred embodiment the video camera comprises a charge coupled device affixed to a remotely controlled pan and tilt mechanism.

4 Claims, 5 Drawing Sheets

SUPPORT PLATE INSPECTION DEVICE

This is a continuation of application Ser. No. 07/865,118, filed Apr. 8, 1992, U.S. Pat. No. 5,265,129 issued on Nov. 23, 1993.

FIELD OF THE INVENTION

The present invention is directed to the field of nuclear power plant inspection devices. In particular, the present invention is directed to the field of nuclear power plant steam generator inspection.

BACKGROUND OF THE INVENTION

Nuclear power plants typically contain three major components as shown in FIG. 1: a reactor which produces superheated water which is transported to one or more steam generators; and a power turbine, driven by the steam, which generates electrical power.

The superheated water is transported to the steam generator by a tube sheet. The tube sheet in a nuclear steam generator typically forms a pair of tube members or tube rows separated by a lane, and held together by a plurality of support plates, separated at periodic intervals. The height of each tube row may exceed thirty-two feet, and include six to eight or more support plates, each separated horizontally at three to six foot intervals. In the steam generator, the tube sheets carrying the superheated water are quenched with cool water, which generates the steam which drives the turbine. The water exits through a plurality of access ports situated at the bottom of each lane.

This procedure for generating steam presents several problems. First, the water used to quench the tube sheet is supplied directly from adjacent rivers or reservoirs. Such water often has impurities or chemicals which may pierce or corrode both the steam generator tubes and the support plates. Periodic inspections of nuclear steam generators are required for obvious safety reasons connected to their operation, and steam generator cleanliness has been a problem due to such pipe corrosion and damage. The highly corrosive environment of the steam generator is particularly problematic for many of the older nuclear reactors in service throughout the world.

Heretofore, the tubes and support plates of these steam generators were inaccessible from visual inspection. Information was gathered by complicated systems which could not adequately inspect all sections of the tubes and support plates. Because of the highly radioactive environment and the heat of the pipes, direct human inspection has typically been restricted to between three and five minutes per man per six month period. This time period does not provide an ample opportunity for the careful inspection for corrosion, holes and leaks. It is particularly difficult to inspect within the narrow lanes and the tubes at the support plates, because of the heat, radioactivity and narrowness of the lanes separating the tube sheet members and the small access ports.

There are a number of issued patents directed to mechanical steam generator inspection and repair devices. U.S. Pat. No. 4,673,027 for example, discloses a device for inspecting and repairing the tubes of a nuclear reactor steam generator. The device includes a manipulator which is insertible in the chamber and which may be locked onto the tube sheet for supporting remotely controlled and monitored inspection instruments in tools. The manipulator includes a support leg which is adjustable in length in an axial direction, a main arm connected to and movable relative to the support leg and an equipment carrier which is connected to the main arm.

U.S. Pat. No. 4,653,971 discloses a device for selectively positioning a tool carried by a vehicle which moves on a perforated plate, while the device utilizes an elbow which swings a telescoping arm in the position. Similarly, U.S. Pat. No. 4,945,979 discloses an improved robotic arm for effecting a tube plugging operation. The system also includes an elbow control mechanism.

U.S. Pat. No. 4,205,939 discloses an apparatus for remotely repairing the tubes in a steam generator. The device includes a boom pivotally mounted on a column and a system for rotating the column and the boom therewith. The disclosed device further includes a tool which is operable on the tubes.

U.S. Pat. No. 4,231,419 discloses a manipulator for inspecting and repairing the tubes of heat exchangers. An inspection arm is inserted and removed through a lead-in nozzle and a swivel arm carries an extendable and retractable mouthpiece carrier with a mouthpiece which can be aligned into the tube openings. Finally, U.S. Pat. No. 4,919,194 discloses a method of positioning a robot for inspecting and maintaining operations within a nuclear plant.

While each of the above mechanism has been utilized to inspect and/or repair nuclear power steam generators and include the use of robotic manipulators or arms, none have been successfully utilized to inspect the outer diameter of the steam tube bundle or the support plates None of the above devices can enter the 1", 2", 4", or 6" diameter apertures situated proximate to the tubes The device disclosed in U.S. Pat. No. 4,673,027, for example, is described as entering the steam generator through a manhole, typically called the primary channel head.

There has been a long felt need for a steam generator tube sheet and support plate inspection system which can be inserted through the access ports of the steam generator, and which can be used to thoroughly inspect the tubes and support plates situated within the lanes between the tube rows. There further has been a long felt need for a support plate inspection and cleaning device which facilitates the inspection and cleaning of the rear of a steam generator and which may be insertable through the smallest access ports in the steam generator.

SUMMARY OF THE INVENTION

In view of this long felt need and in accordance with the present invention, a support plate inspection device and method for inspecting within the lanes separating the tube sheets of a nuclear steam generator are disclosed. The device of the present invention facilitates the inspection of the tube sheet and support plates of a nuclear steam generator and particularly inspection within the lanes situated between the tubes. In a preferred embodiment, the device comprises a boom means for extending into an access port of a steam generator and into a lane separating two rows of tube members, said boom means being uprightable within said lane; and video camera means attached to said boom means for inspecting the tubes and support plates within said lane.

In a more preferred embodiment, the present invention is directed to a support plate inspection device comprising first boom coupled by a rotatable connector to a second boom, said first and second booms being insertable through the access port of a steam generator and into a lane between two rows of tubes, said rotatable connector facilitating the rotational movement of said second boom such that said second boom can be held upright through said tube lane and adjacent to the tubes and support plates of a steam generator, the second boom having a charge coupled device (CCD) video camera attached thereto such that said second boom and CCD video camera can be uprighted and positioned adjacent to the support plates in a steam generator such that the tubes and support plates can be examined by said CCD video camera.

In more preferred embodiments, the second boom comprises a plurality of telescoping members which can extend a length of up to approximately 32 feet, the height of a standard steam generator tube. The CCD video camera is preferably mounted to a pan and tilt means which is under the control of a remote joy stick. The CCD video camera also preferably includes an auto-focus mechanism. In yet more preferred embodiments, the present invention includes means for cleaning the tubes and support plates.

The present invention is also directed to a method for inspecting the support plates and tube sheet of a nuclear steam generator. The method comprises the following steps: inserting boom means through an access port of said generator and within a lane separating two tube sheets, said boom means having a CCD video camera attached thereto; and uprighting said boom means within said lane such that said CCD video camera may be held adjacent to said tube sheet and support plates such that said tube sheet and support plates can be inspected by said CCD video camera.

These and other advantages and features of the present invention will become apparent from the detailed description which follows.

DETAILED DESCRIPTION OF THE PREFERRED EMBODIMENT

Figure 1:
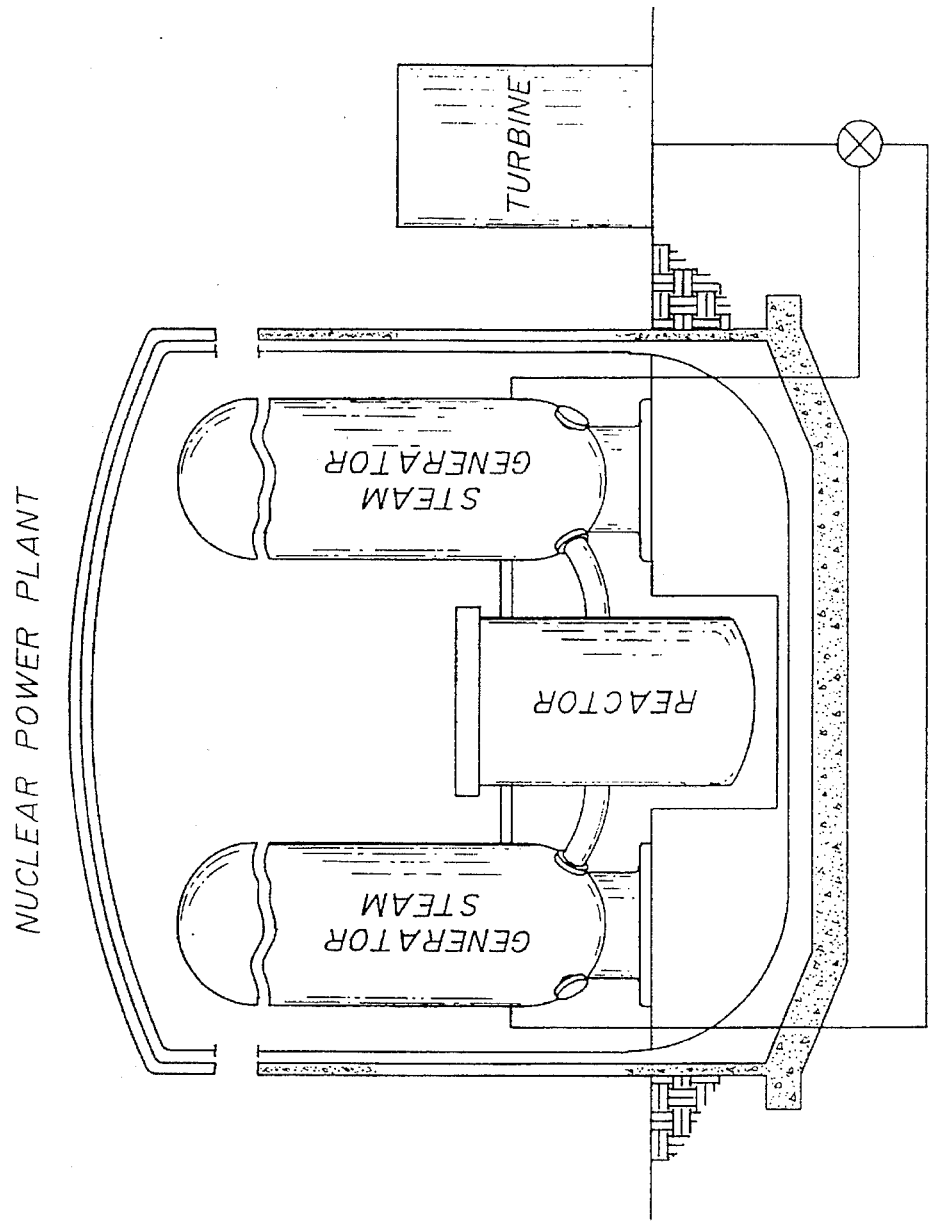
FIG. 1 is a representation of the components of a nuclear power plant.
Figure 2:
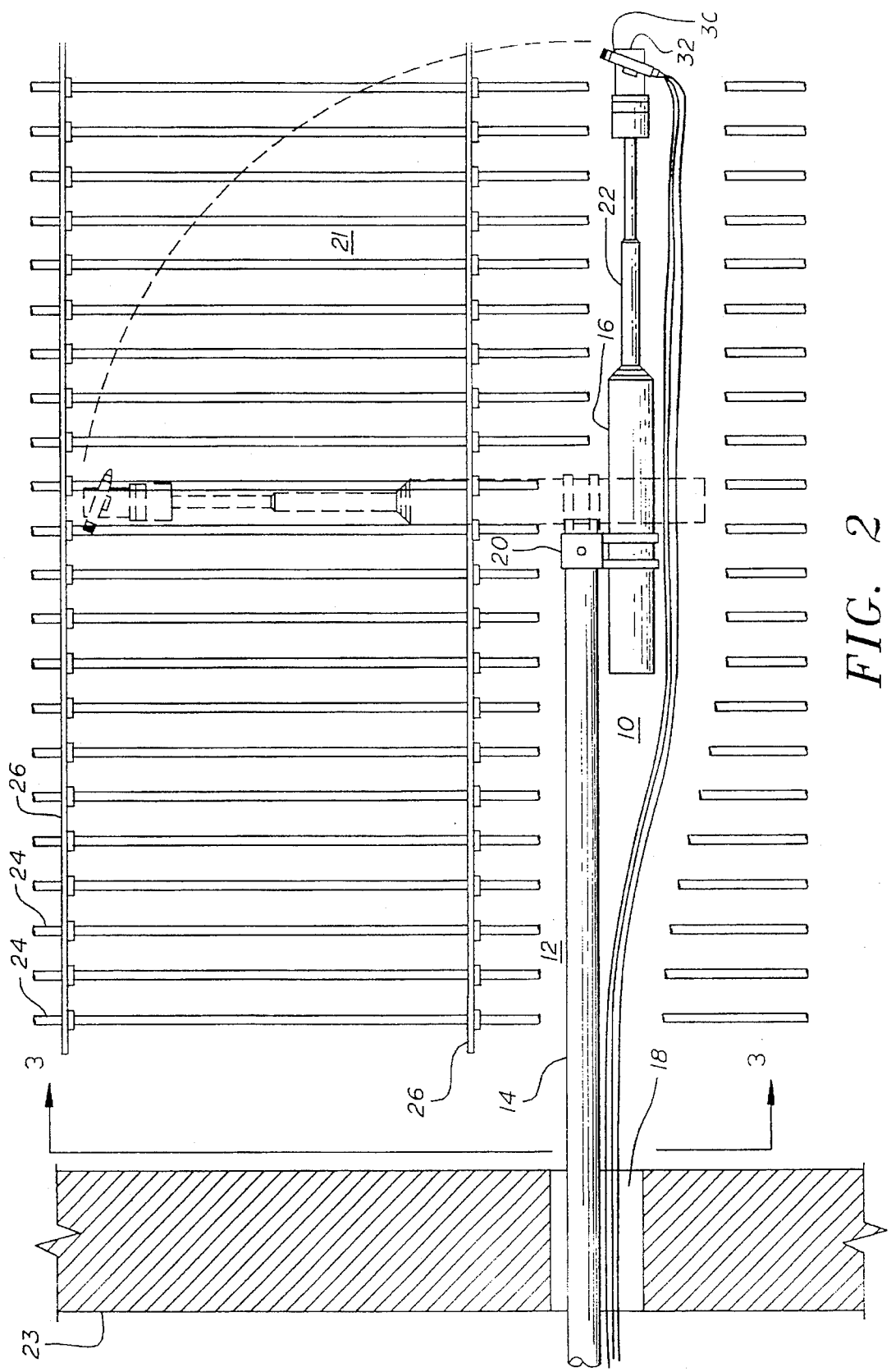
FIG. 2 is a perspective view of the support plate inspection device of the present invention which illustrates the rotatability of the inspection device.

The present invention is described with reference to the enclosed Figures wherein the same reference numbers are utilized where applicable. Referring to FIG. 2, the support plate inspection device 10 of the present invention is illustrated. It is to be appreciated by those skilled in the art that the present invention will be utilized to facilitate the easy and rapid inspection of the support plates and tubes of a nuclear steam generator. Typically, the tubes form rows of tube members 24, 24a which are separated by lanes 21, and are retained in position by a plurality of support plates 26. The bottom of each lane typically includes one or more access ports 18 through the which the quenching water exits the generator. This water may have impurities which may corrode or pierce the pipes of the tube sheets, thus resulting in leaks of radioactive superheated water. Such leaks may not be visible to the human eye. Because of the limited access ports, it is difficult for direct human inspection of the pipes to take place.

The support plate inspection device 10 of the present invention, in a preferred embodiment, comprises boom means 12 for extending into an access port 18 of a steam generator and into a lane 21 separating two tube sheet members 24, 24a. The boom means is uprightable within the lane 21. A video camera means 30 is attached to the boom means for inspecting the tube members 24, 24a and support plates 26 within the lane 21 when said boom means is uprighted.

In a more preferred embodiment, the boom means 22 is multi-sectioned and includes first boom means 14 rotatably coupled to second boom means 16. Boom means 14, 16 are joined by a rotatable joint or connector means 20 such as an elbow joint. The rotatable connector 20 may be activated mechanically via a hand crank, or by means of a pneumatic or hydraulic activator.

As shown in FIG. 2, rotatable connector means 20 facilitates the selective vertical rotation of the second boom means 16 with respect to the first boom means 14 within the lane 21. While the present invention has been illustrated in the context of a rotatable elbow joint, it is to be appreciated that the present invention may be utilized with any means for rotating maneuvering the second boom means upwardly relative to first boom means.

The first and second boom means 14, 16 are, in one embodiment cylindrical booms members, which enter the steam generator through access port 18 in the wall 23 of the steam generator, and extended within the lane 21 separating two rows of tube members 24, 24a. Wall 23 is typically constructed from steel. The access port may be 1", 2", 4", or 6" in diameter. By enabling access of the inspection device of the present invention through the 1" or 2" access ports, the present invention provides for the inspection of the complete secondary side of the tube sheet and the support plates.

Figure 4:
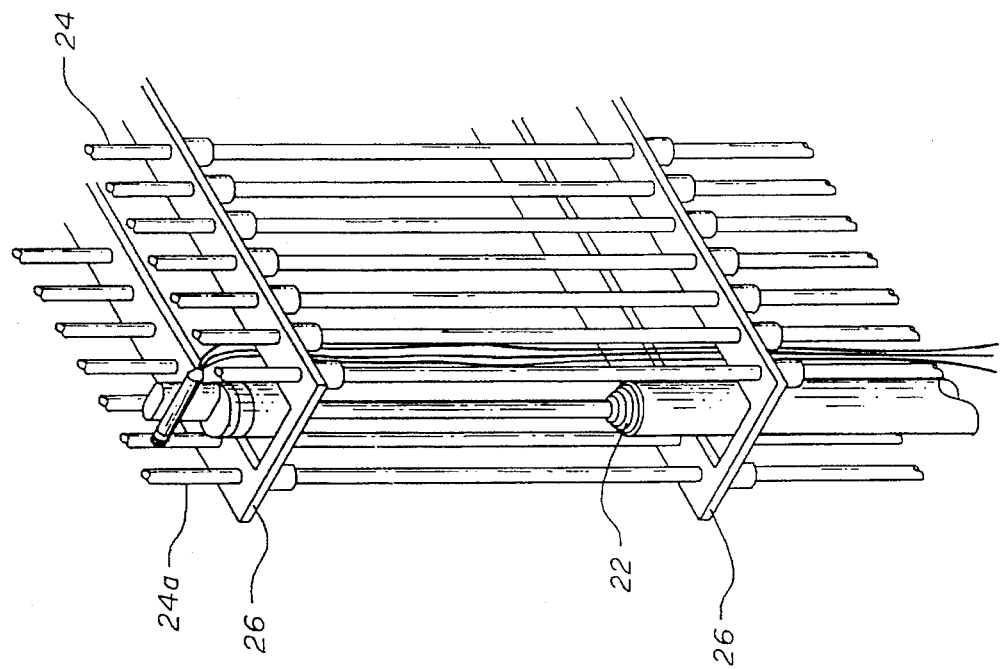
FIG. 4 is an elevated view of the support plate inspection device of the present invention.
Figure 3:
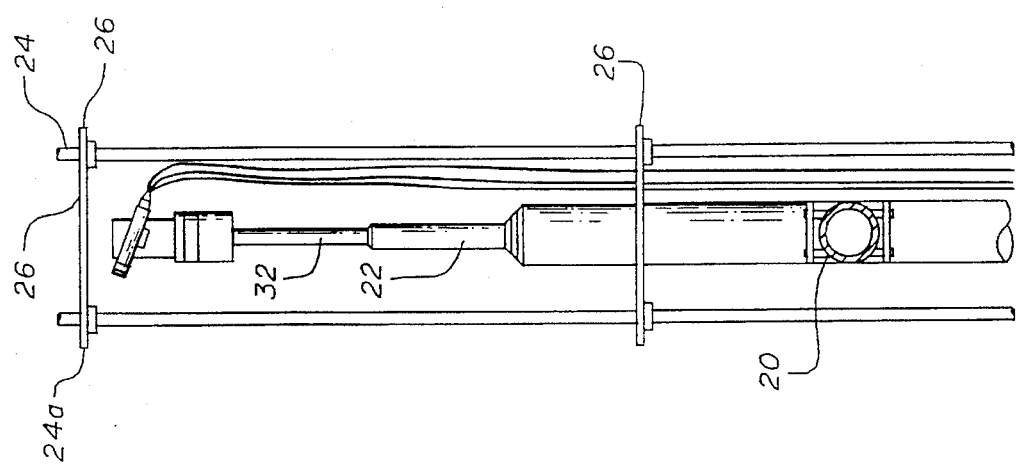
FIG. 3 is a perspective view of the support plate inspection device along line 3—3 FIG. 2.
Figure 5:
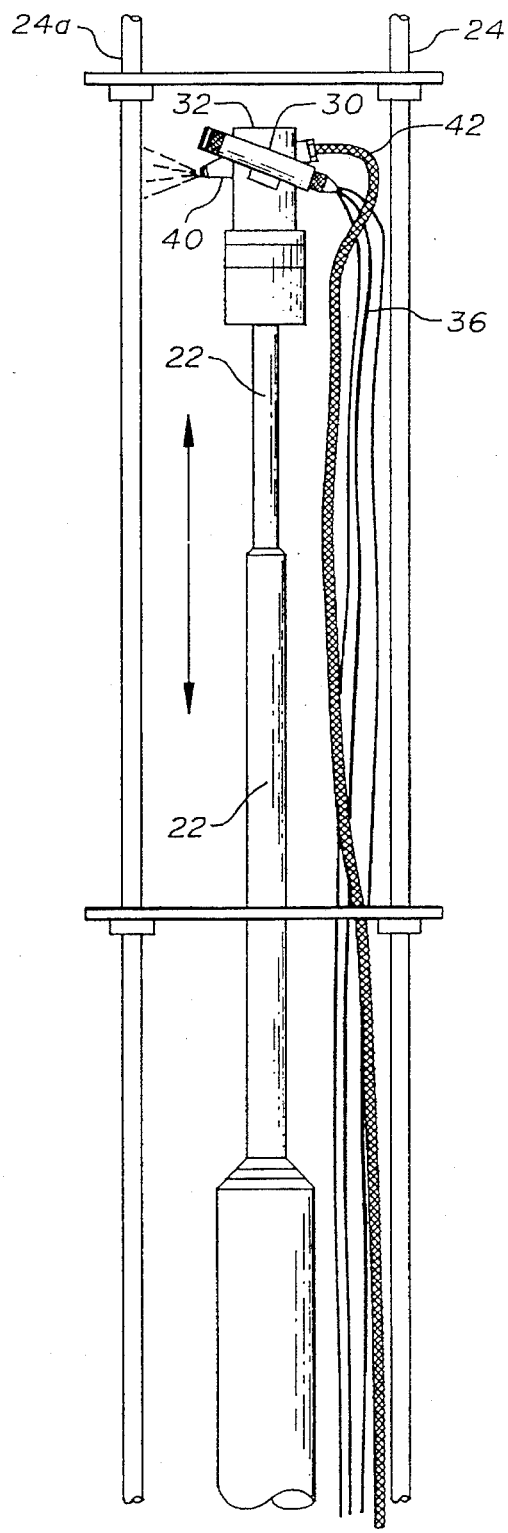
FIG. 5 is an isolated view of the telescoping second boom member of the support plate inspection device of the present invention.

As shown in FIGS. 3, 4 and 5, second boom means 16 preferably comprises a plurality of telescoping members 22 which are extendable pneumatically or hydraulically. The multiple telescoping members 22 facilitate the selective vertical or longitudinal adjustment of the second boom means 16 within the tube lane 21. Telescoping members 22 facilitate a full visual inspection of the reactor support plates 26 and tube members 24, 24a. In a preferred embodiment, the second boom means 16 should have telescoping members 22 of sufficient quantity and length to permit the vertical extension of the second boom means 16 of up to approximately 32 feet. This is the typical height of the tubes and will facilitate inspection of the entire tube sheet and all of the support plates.

The support plate inspection device 10 further includes a video camera 30 which is attached at or near the distal end of the second telescoping boom means 16, and which transmits video images to a TV monitor located outside of the steam generator. In a preferred embodiment, the video camera will incorporate CCD (charge-coupled device) technology. The advent of CCD (charge-coupled devices) image transducers has permitted television cameras to be fabricated in very small sizes. The CCD detector assembly is positioned to receive optical images from the camera lens so that it can convert the components of the received image to corresponding electrical signals. Electrical circuitry associated with the detectors converts the image component signals to standard video signals for use by television receiver/monitors. In the present invention, the CCD circuitry may, for example, comprise Sony Model A-7560-026A, which functions to convert optical images received from a lens assembly into electrical video signals. The lens assembly of the preferred embodiment, may, for example, comprise Sony Model VCL08SBYA.

Figures 7, 7A:
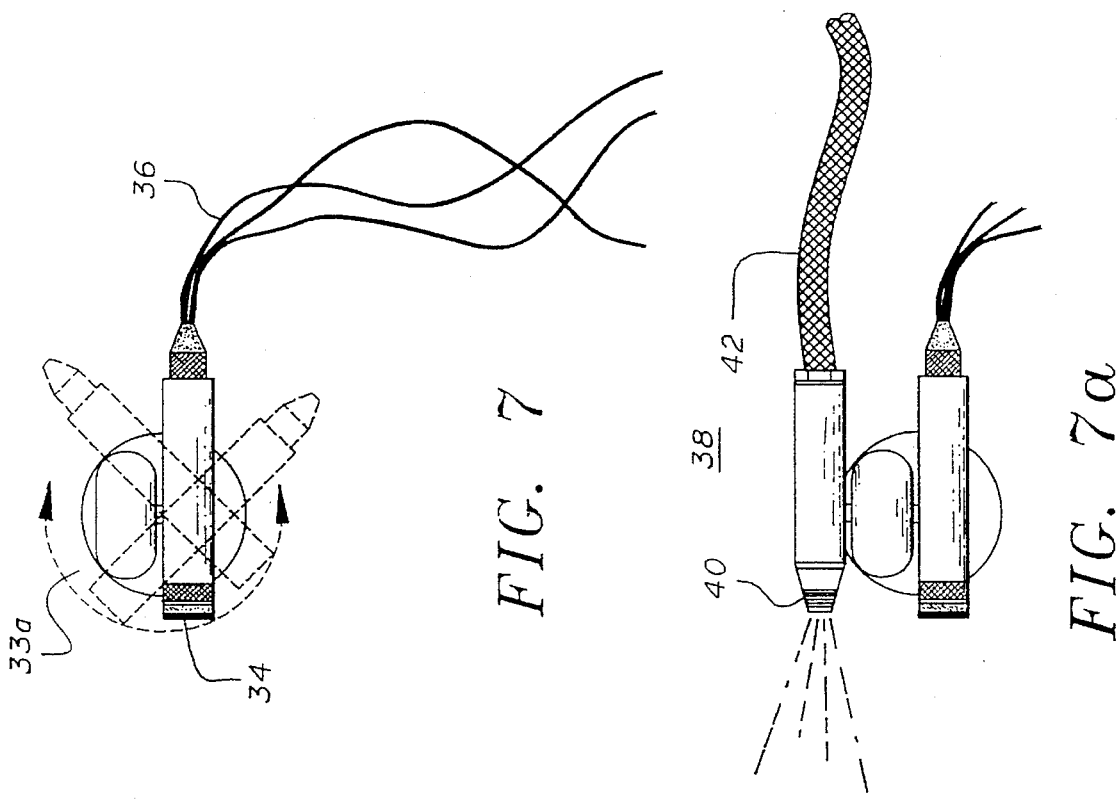
FIG. 7 illustrates tile panning ability of the CCD video camera of the support plate inspection device of the present invention.
FIG. 7A illustrates the attachment of a cleaning means to the support plate inspection device of the present invention.
Figure 6:
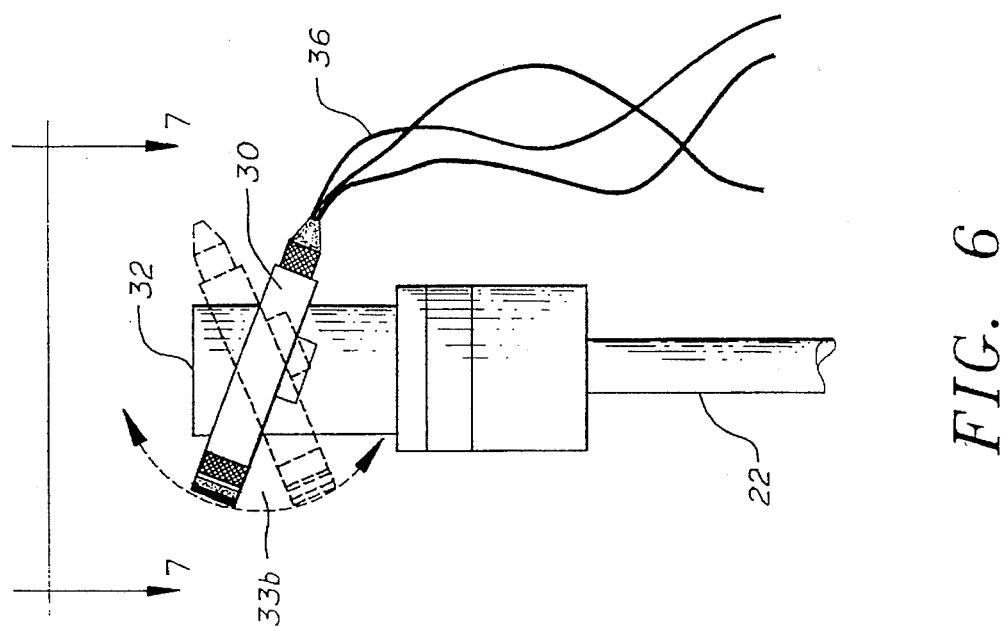
FIG. 6 illustrates tile tilting ability of the CCD video camera of the support plate inspection device of the present invention.

The distal end of the second boom means 14 supporting the CCD camera further incorporates a pan and tilt means 32, to which video camera 30 is attached. As shown in FIGS. 6 and 7, pan and tilt means 32 facilitates the horizontal 32a and vertical rotation 32b of the video camera 30. In a preferred embodiment, the video camera should be able to pan 359° and tilt approximately 180°. In this manner, the video camera 30 can completely inspect the tube members 24, 24a and support plates 26. In a preferred embodiment, the video camera 30 will also preferably incorporate an auto focus mechanism 34 which, along with the pan and tilt means 32, will be controlled by an operator with a joy stick (not shown) on the outside of the steam generator.

FIGS. 6 and 7 further illustrate connecting cables 36 which facilitate the remote operation of the auto focus and pan and tilt mechanism from the joy stock. The cables 36 from the video camera 30 lead to the closed circuit TV monitor located on the outside of the steam generator.

Finally, as shown in FIG. 7A, the present invention further includes means 38 for cleaning the tubes 24, 24a and support plates 26. Means 38 will be affixed to the pan and tilt means 32. In a preferred embodiment, means 38 will comprise a nozzle 40 with attached hose 42 which will jet hot water, steam or a chemical cleaner to clean the tube members 24, 24a and support plates 26.

The operation of the present invention is now described with reference to the enclosed Figures. As noted above, the present invention is utilized to inspect the support plates 26 and tube members 24, 24a of a nuclear steam generator. Initially, as shown in FIG. 2, the support plate inspection device 10 is inserted through an access port 18 in the wall 23 of the steam generator and through a lane 21 dividing two rows of tube members 24a, 24b. The second telescoping member 16 having the CCD video camera 30 attached thereto is uprighted using rotational connector joint means 20. The rotational joint means 20 may be uprighted using a mechanical crank, or alternatively, with a hydraulic or pneumatic power source. The telescoping second boom means 16 extends upwardly in the lane 21 so as to facilitate the inspection of the support plates and the tube sheet members. The telescoping second boom means 16 can be longitudinally adjusted such that the CCD camera 30 can obtain a full and complete visual inspection of the support plates 26 and complete tubes. The telescoping members 22 should enable the CCD camera to extend vertically approximately 32 feet in order facilitate the full examination of the tubes and support plates.

By adjusting the auto focus and pan and tilt means using a joystick situated outside the generator, the CCD camera can fully inspect the tubes 24, 24a sheet and support plates 26. The operator, safely outside the generator, can monitor the inspection on a closed circuit TV camera used in association with the CCD camera 30. By selectively extending the telescoping second boom 16 up to a length approximately 32 feet, the CCD camera 30 can fully inspect each of the four to six support plates which retain the tube sheet members. Means 38 can be utilized to get hot water, steam or chemical cleaner to remove corrosion and dirt from the tube members 24, 24a and support plates 26.

When the inspection is completed, the telescoping members 22 are retracted and the second boom means is rotated downward as shown in FIG. 2. The support plate inspection device 10 is withdrawn through access port 18 in wall 23. The procedure may then be repeated by extending the device into another access port 16.

The present invention has been described with reference to the enclosed figures and the above-detailed description. It is to be appreciated that numerous modifications and embodiments fall within the spirit of the present invention and that the true nature and scope of the present invention should be determined with reference to the claims appended hereto.

We claim:

1. A device for inspecting the support plates and tube sheet of a nuclear steam generator comprising:

a first boom coupled by a rotatable connector to a second boom, said first and second boom and said rotatable connector being insertable into an access port of a steam generator and into a lane separating two rows of tube members, said rotatable connector being adapted to upright said second boom within said lane; and a maneuverable CCD camera attached to said second boom for inspecting the tube members and support plates within said lane when said second boom is uprighted.

2. A device for inspecting or cleaning the tube sheets and support plates of a nuclear steam generator comprising:

a first boom coupled by a connector to a second boom, said first and second boom and said rotatable connector being insertable through an access port of a steam generator and into a lane separating two rows of tube members, said tube members being supported by at least one support plate, said connector being adapted to upright said second boom to a position adjacent to said tube members and said at least one support plates, said second boom having a CCD camera or spray nozzle attached thereto such that when said second boom and said camera or cleaning means are uprighted adjacent to said support plate and said tube members, said at least one support plate and said tube sheet members can be examined with said camera or sprayed with said nozzle cleaning means.

3. A method for inspecting the tube sheet of a steam generator comprising the following steps:

inserting a boom through an access port of said steam generator and within a lane separating two rows of tube members, said boom having a maneuverable CCD camera attached thereto; and uprighting said boom within said lane, separating said rows of tube members, such that said CCD camera is held adjacent to said tube members and support plates and can be inspected by said camera within said lane.

4. A device for cleaning the support plates and tube sheet of a nuclear steam generator comprising:

a first boom coupled by a rotatable connector to a second boom, said first and second boom and said rotatable connector being insertable into an access port of a steam generator and into a lane separating two rows of tube members, said rotatable connector being adapted to upright said second boom within said lane; and video camera means attached to said boom means for inspecting the tube members and support plates within said lane when said second boom is uprighted.

* * * * *